United States Patent
Niedbalski et al.

(10) Patent No.: US 6,258,281 B1
(45) Date of Patent: *Jul. 10, 2001

(54) BREAKING DOWN AROMATIC COMPOUNDS IN INDUSTRIAL WASTEWATERS

(75) Inventors: Edmund Niedbalski; Laurance Thurman, both of Baton Rouge, LA (US); Irene Troetsch-Schaller, Rissersheim (DE); Ludwig Schuster, Limburgerhof (DE); Dieter Voges, Mannheim (DE); Peter Zehner, Ludwigshafen (DE); Klaus Bittins, Frankenthal (DE); Rudolf Schnur, Baton Rouge, LA (US)

(73) Assignee: BASF Aktiengesellschaft (DE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/336,722

(22) Filed: Jun. 21, 1999

Related U.S. Application Data

(63) Continuation of application No. 08/395,511, filed on Feb. 27, 1995, now abandoned, which is a continuation of application No. 08/092,839, filed on Jul. 16, 1993, now abandoned.

(51) Int. Cl.$^7$ .................................................. C02F 1/78
(52) U.S. Cl. ................................... 210/760; 210/909
(58) Field of Search ........................ 210/760, 903, 210/909, 192

(56) References Cited

U.S. PATENT DOCUMENTS 1,341,913   6/1920   Leggett .
2,703,312   3/1955   Hann et al. .
3,445,001 * 5/1969   La Raus .

(List continued on next page.)

FOREIGN PATENT DOCUMENTS

| 25 34 892 | 2/1977 | (DE) . |
| 33 16 265 A1 | 2/1984 | (DE) . |
| 0378994 * | 7/1990 | (EP) . |
| 0 378 994 | 7/1990 | (EP) . |
| 1130539 | 12/1984 | (SU) . |

OTHER PUBLICATIONS

Levenspiel, *Chemical Reaction Engineering*, $2^d$ ed., John Wiley & Sons, pp. 443,445–448, (1972).*

Katalytische Naβoxidation von biologisch schwer abbubaren Abwasserinhaltsstoffen unter milden Reaktionsbedingungen, Chem.–Ing.–Tech. 62 (1990) Nr. 7, S.555–557.

(List continued on next page.)

*Primary Examiner*—Chester T. Barry
(74) *Attorney, Agent, or Firm*—Nixon Vanderhye P.C.

(57) ABSTRACT

A process for breaking down aromatics in industrial wastewaters that contain small amounts of aromatics by reaction with an ozone-containing oxygen stream at a temperature of from 40 to 70° C. and at a pH of from 4 to 7, involves treating industrial wastewaters that contain small amounts of aromatics in two stages with an oxygen stream that contains from 5 to 8% by volume of ozone with thorough mixing by causing the wastewater to flow upward through two reaction zones, the overflow of the wastewater at the top of the first reaction zone entering the second reaction zone at the base, the purified wastewater being obtained at the top of the second reaction zone, the ozone-containing oxygen stream first entering at the base of the second reaction zone, and the waste gas obtained at the top of the second reactor being introduced at the base of the first reaction zone, and, furthermore, a gas containing less than 0.2% by volume of ozone being obtained at the top of the first reaction zone.

20 Claims, 1 Drawing Sheet

U.S. PATENT DOCUMENTS

| | | | |
|---|---|---|---|
| 3,997,631 | * | 12/1976 | Matsuoka . |
| 4,197,198 | | 4/1980 | Watson et al. . |
| 4,604,214 | | 8/1986 | Carr et al. . |
| 4,804,480 | | 2/1989 | Jayawant . |
| 4,915,842 | | 4/1990 | Kearney et al. . |
| 5,124,051 | | 6/1992 | Bircher et al. . |
| 5,173,257 | * | 12/1992 | Pearson . |

OTHER PUBLICATIONS

102: 154316u Purificationn of wastewater; Siirde E.; et al; Chemical Abstracts; 60–Waste Treatment, vol. 102, 1985, p. 317.

U.S. Serial No. 07/457,884 filed Dec. 27, 1989 (Abandoned).

U.S. Serial No. 08/603,197 filed Feb. 20, 1996 (Pending).

"Chemie–Ingenieur–Technik", vol. 46, No. 8, Apr. 1974, p. 339, W. Grünbein, Ozonisierung von Ab–wasser.

Chem Abstracts 102: 172028f and V. Caprio et al, Ozone Sci Eng. 1984, 6(2), 115–21.

Chem Abstracts 108: 26755y and V.F. Vakulenko et al, Khim. Tekhnol. Vody 1987, 9(5), 414–16.

Chem Abstracts 102: 225752w and W.J. Masschelein et al, Ozone Sci. Eng. 1984, 6(3), 143–62.

Chem Abstracts 102: 154316u, SU 1,130,539 (1984).

Chem Abstracts 106: 89576v and M.A. Shevchenko et al, Khim. Tekhnol. Vody, 8(6), 7–10 (1986) (English Translation).

Derwent Abstracts AN 92–197 842 (SU–A–1 662 949), Jul. 15, 1991.

* cited by examiner

BREAKING DOWN AROMATIC COMPOUNDS IN INDUSTRIAL WASTEWATERS

This is a continuation of application Ser. No. 08/395,511, filed Feb. 27, 1995, now pending, which in turn is a continuation of application Ser. No. 08/092,839 filed Jul. 16, 1993, now abandoned.

FIELD OF THE INVENTION

The present invention relates to a process for breaking down aromatics in industrial wastewaters that contain small amounts of organic and inorganic nitrogen compounds by reaction with an ozone-containing oxygen stream at from about 40 to 70° C. and at a pH of from about 4 to 7.

BACKGROUND OF THE INVENTION

It is known from EP-A-378 994 that nitrobenzene synthesis wastewaters, which contain various aromatic compounds, in particular nitrophenols, can be purified solely by treatment with ozone at from 20 to 100° C., a pressure of from 1.5 to 10 bar and a pH of from 3 to 12, essentially from 7 to 9, to such an extent that the levels of the original impurities are lowered to below their detection limits.

However, this method is not entirely satisfactory, since the ozone consumption is still relatively high and consequently, because of the high energy requirements of ozone generation, the costs are too high; that is, some of the ozone decomposes without contributing to the breaking down of the aromatics.

OBJECTS OF THE INVENTION

It is an object of the present invention to provide a process which will maximize the proportion of ozone that contributes to breaking down the organic and inorganic nitrogen-based compounds.

SUMMARY OF THE INVENTION

It has been found, surprisingly, that this object is achieved in that combination of the following measures leads to an appreciably improved utilization of the ozone used:

a) industrial wastewaters that contain small amounts of aromatics b) are treated in two stages with an oxygen stream that contains from about 5 to 8% by volume of ozone with thorough mixing by causing the wastewater to flow upward through two reaction zones, the overflow of the wastewater at the top of the first reaction zone entering the second reaction zone at the base, the purified wastewater being obtained at the top of the second reaction zone, the ozone-containing oxygen stream first entering at the base of the second reaction zone, and the waste gas obtained at the top of the second reactor being introduced at the base of the first reaction zone, and, furthermore, a gas containing less than about 0.2% by volume of ozone being at the top of the first reaction zone;

c) the breaking down is carried out in both the reaction zones at from about 40 to 70° C.;

d) the reaction is carried out essentially under atmospheric pressure;

e) the wastewater is introduced at the base of the first reaction zone with a pH of from about 4 to 7 and at the base of the second reaction zone with a pH that is lower by from about 2 to 3 units, or the wastewater is continuously operated between a pH of from about 4 to 7 throughout the ozonization, and f) the purified wastewater, which is virtually completely free of organic constituents, is discharged without further biological treatment.

DETAILED DESCRIPTION OF THE PREFERRED EKBODIKENTS

Figure 1:
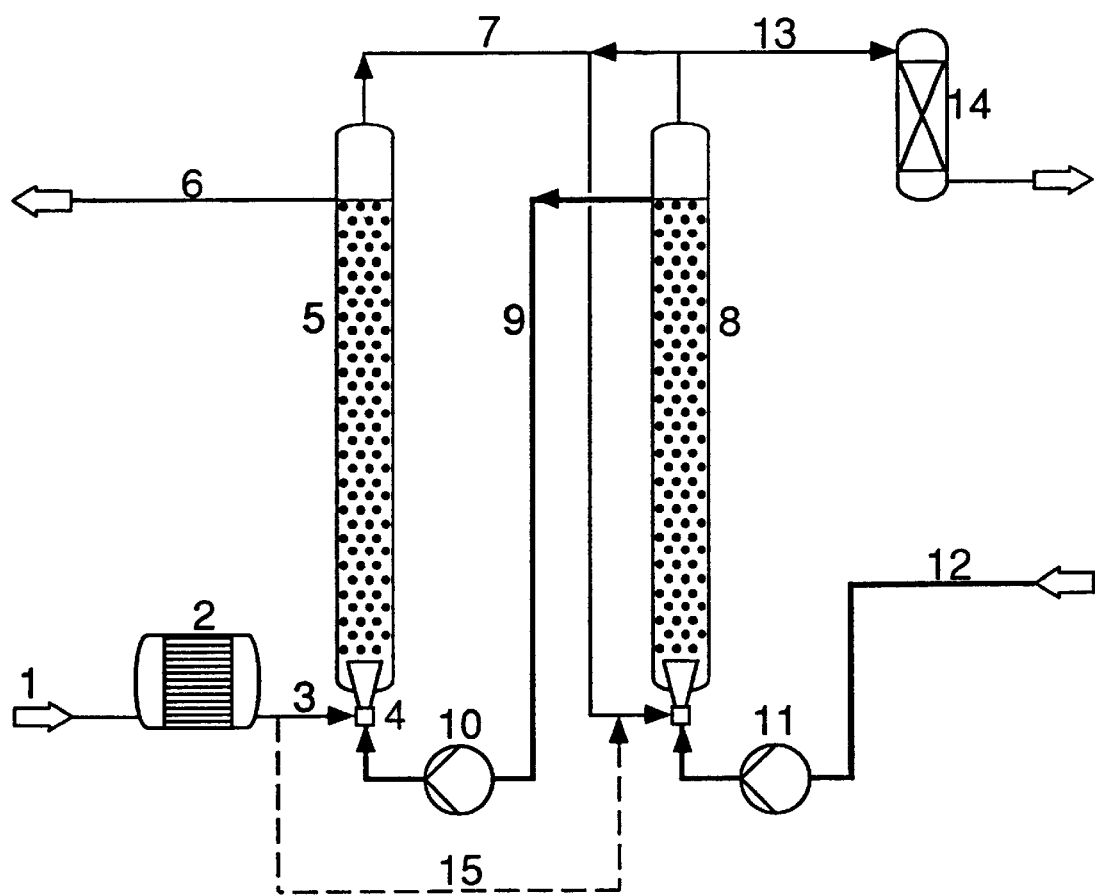
FIG. 1 is a view of the wastewater treatment system and apparatus according to the invention.

In a preferred embodiment of the process of the invention, the wastewater used contains nitroaromatics.

In a further preferred embodiment, the wastewater comes from nitrobenzene synthesis and contains essentially nitrophenols.

In another desirable embodiment of the invention, the wastewater contains inorganic nitrogen compounds, for example, nitrates and nitrites.

In a further preferred embodiment, some of the waste gas obtained at the top of the second reaction zone, for example from about 10 to 50% by volume of this stream, is recirculated to the base of the second reaction zone.

In another preferred embodiment, some, for example from about 10 to 50% by volume, of the oxygen stream that contains about 5–8% by volume of ozone can be bled off and introduced at the base of the first reaction zone.

Suitable aromatics-containing wastewaters are any desired industrial wastewaters which by other conventional methods are difficult or impossible to purify to such an extent that they can be subjected to a biological treatment, or where by other conventional methods, even in combination, it is impossible to achieve a certain, usually legally prescribed purity.

This applies for example to nitrobenzene synthesis wastewaters, which contain nitrophenols (mono-, di- and trinitrophenol), which have a toxic effect on microorganisms of a biological water treatment plant. It is true that by using a pretreatment under elevated pressure and temperature in the presence or absence of oxygen it is possible to break down the nitrophenols to such an extent that substantial degradation in a biological treatment becomes possible. However, the degree of degradation achieved in this way is still not sufficient to meet the pretreated wastewater specification stipulated in some countries, and therefore the proposal has been, as mentioned earlier, to employ ozonization. An alternative is incineration of the wastewater, which has of course very high energy requirements.

The present, improved ozonization process makes it possible, then, despite the costs of ozone generation and ozone treatment, to obtain almost complete purification of the wastewater at relatively low cost.

In the case of wastewaters from nitrobenzene synthesis it is advantageous, prior to the treatment with ozone, to strip the level of nitrobenzene down to less than 100 ppm.

Nitrobenzene synthesis wastewaters contain for example—in addition to nitrobenzene—up to 100 ppm of mononitrophenol, up to 2000 ppm of dinitrophenol and up to 1000 ppm of trinitrophenol (picric acid), each of which the treatment with ozone according to the invention breaks down to the detection limit. In fact, the originally yellow wastewaters are decolorized in just the first treatment stage and thereafter the virtually complete breakdown into $CO_2$, water and mineral salts takes place in the second stage.

The process according to the invention can also reduce the quantity of inorganic nitrogen compounds such as nitrates and nitrites to less than about 1.5 ppm.

The two-stage treatment with ozone is advantageously carried out in two, generally equal-sized, upright cylindrical reactors in which the wastewater and the ozone-containing oxygen stream are each passed upward. Although the wastewaters can in principle also be passed countercurrently to the ozone/oxygen stream, it is preferable to employ the concurrent option, since the ozone/oxygen stream is advantageously introduced at the base of the reactor via one or more feed points, preferably injection nozzles, and in this way intimate mixing of the gas and liquid phases is possible.

The ozone/oxygen mixture is generated in a conventional manner in ozonizers by electric discharges in an oxygen stream. In this way it is possible to obtain an oxygen stream that contains from about 5 to 8% by volume of ozone, which is metered in such a way that its ozone content drops to below about 0.2% by volume by the point of exit at the top of the first reaction zone. Those skilled in the art will find that the volume percentages of ozone set forth above may vary. For example, the oxygen stream may initially have an ozone content as low as about 1%. Similarly, the ozone content leaving the top of the first reaction zone may be 0.1% or less. These ozone residues in the waste gas leaving the first reaction stage can then advantageously be catalytically destroyed before the waste gas is discharged into the atmosphere.

Control of the pH has proved important for achieving rapid breakdown and minimizing ozone consumption. Accordingly, the pH of the wastewater entering the first reactor should be from about 4 to 7, preferably within the range of about 5 to 6.5, more preferably between 5.5 to 6.5 most preferably about 6 to 6.5. In the course of the treatment of the wastewater with ozone the pH will have decreased by from about 2 to 3 units by the overflow of the first reactor, e.g. from the starting pH of about 6 to about 3, only to generally rise again in the second reactor, normally by from about 2 to 3 units. In another embodiment, the pH is continuously operated within the range of about 4–7, preferably about 6 to 6.5. The temperature of the ozone treatment is important also, and the best results are obtained within the range of from about 40 to 70° C., more preferably within the range of about 55 to 65° C., and more desirably about 60 to 65° C.

The amount of the ozone-containing oxygen stream is chosen in such a way that the waste gas at the top of the first reactor, ie. after passage through both reactors, has a residual ozone content of less than about 0.2% by volume and the breakdown of the pollutants of the wastewater has taken place to the desired completeness.

Referring now to FIG. 1, an especially detailed procedure comprises for example, using an oxygen stream (1) to produce in the ozonizer (2) an oxygen stream (3) which contains from about 5 to 8% by volume of ozone and which is passed, preferably by injection nozzles (4), into the second reactor (5). At the top of reactor (5) purified wastewater (6) is withdrawn. The ozone/oxygen stream (7) obtained at the top of the second reactor (5) is passed together with untreated wastewater (12) into the first reactor (8) via injection nozzles (11) and leaves as waste gas stream (13), which still contains residual amounts of ozone, which is destroyed in the deozonizer (14). The overflow of the first reactor (8) is reintroduced at the base of the second reactor (5), in general via an injection nozzle (10).

Furthermore, from about 10 to 50% of the waste gas stream (13) can be recirculated into stream (7) for pressure equilibration.

Finally, it is possible to inject part of the ozone/oxygen stream (3), for example from about 10 to 50% by volume thereof, as a bleed stream (15) directly into the first reactor together with stream (7).

The following examples have been provided by way of illustration of one or more preferred embodiments of the invention, and should in no way be construed as limiting the scope thereof.

EXAMPLES

The following are composite examples of several sets of operating conditions on several days.

Example 1

Feed pH 5.5–6.5

TOC 1050–1450 ppm

Temp. 60–65° C.

An oxygen stream is fed to the ozonizer to produce a stream which contains 1–8% ozone which is passed through injection nozzles into the second reactor out of the second reactor and to the injection nozzles of the first reactor and then passes out of the top of the first reactor containing 0.0–0.4% ozone and on to the deozonizer and from there to the atmosphere.

The wastewater stream at a pH of 5.5–6.5, temperature of 60–65° C., and organic concentration of 1050–1450 ppm is passed to the first reactor, where the pH falls to 3.5–4.5, and then overflows the reactor to the second reactor where the pH rises to 6–7 and then out of the top of the second reactor to be discharged containing an organic concentration of 10–20 ppm.

The consumption of lbs. of ozone per lb. of organic carbon reduced to $CO_2$ is 5.5–6.

Comparative Example 2

Feed pH 8.5–11.5

TOC 1050–1450

Temp. 60–65° C.

An oxygen stream is fed to the ozonizer to produce a stream which contains 1–8% ozone which is passed through injection nozzles into the second reactor out of the second reactor and to the injection nozzles of the first reactor and then passes out of the top of the first reactor containing 0.0–0.4% ozone and on to the deozonizer and from there to the atmosphere.

The wastewater stream at a pH of 8.5–11.5, temperature of 60–65° C., and organic concentration of 1050–1450 ppm is passed to the first reactor, where the pH falls to about 7–7.5, and then overflows the reactor to the second reactor where the pH remains the same and then out of the top of the second reactor to be discharged containing an organic concentration of 10–20 ppm.

The consumption of lbs. of ozone per lb. of organic carbon reduced to $CO_2$ is 8–9.

Example 3

Feed pH 5.5–6.5

TOC 1050–1450 ppm

Temp. 60–65° C.

Inorganic Nitrogen Compounds 50–65 ppm

An oxygen stream is fed to the ozonizer to produce a stream which contains 1–8% ozone which is passed through injection nozzles into the second reactor out of the second reactor and to the injection nozzles of the first reactor and then passes out of the top of the first reactor containing 0.0–0.4% ozone and on to the deozonizer and from there to the atmosphere.

The wastewater stream at a pH of 5.5–6.5, temperature of 60–65° C., and organic concentration of 1050–1450 ppm is passed to the first reactor, where the pH falls to 3.5–4.5, and then overflows the reactor to the second reactor where the pH rises to 6–7 and containing an organic concentration of 10–20 ppm and an inorganic nitrogen concentration of 0.5–1.5 ppm.

The consumption of lbs. of ozone per lb. of organic carbon reduced to $CO_2$ is 5.5–6.

While the invention has been described in each of its various embodiments, it is expected that certain modifications thereto may be made by those skilled in the art without departing from the true spirit and scope thereof as set forth in the specification and the accompanying claims.

What is claimed is:

1. A process for breaking down aromatics in industrial wastewater that contains small amounts of aromatics by reaction with an ozone-containing oxygen stream comprising treating said industrial wastewater in two stages with said ozone-containing oxygen stream, by causing said wastewater to flow upward through two reaction zones such that the overflow of said wastewater at the top of a first reaction zone enters a second reaction zone at the base such that purified wastewater is obtained at the top of said second reaction zone, and
    wherein said ozone-containing oxygen stream first enters at the base of said second reaction zone, and further wherein waste gas is obtained at the top of said second reaction zone and is introduced at the base of said first reaction zone, and further wherein said step of treating said industrial wastewater includes introducing an industrial wastewater feed stream at a pH of between 5.5 to 6.5 and at a temperature of from about 40 to 70° C. into the base of said first reaction zone.

2. A process as claimed in claim 1, wherein said wastewater to be treated contains nitroaromatics.

3. A process as claimed in claim 1, wherein said wastewater to be treated is from nitrobenzene synthesis and prior to said treatment with ozone said wastewater has been stripped to nitrobenzene values of less than about 100 ppm.

4. A process as claimed in claim 1, wherein from about 10 to 50% by volume of said waste gas obtained at the top of said second reaction zone is recirculated to the base of said second reaction zone.

5. A process as claimed in claim 1, wherein from about 10 to 50% by volume of said fresh oxygen stream containing ozone is bled off and introduced at the base of said first reaction zone.

6. A process as claimed in claim 1, wherein said breaking down is carried out in both said reaction zones at a temperature of from about 40 to 70° C.

7. A process as claimed in claim 6, wherein said reaction is carried out essentially under atmospheric pressure.

8. A process as claimed in claim 7, wherein said overflow of said wastewater which is withdrawn from the top of said first reaction zone is introduced at the base of said second reaction zone with a pH that is lower by from about 2 to 3 units as compared to the pH of said wastewater feed stream which is introduced into the base of said first reaction zone.

9. A process as claimed in claim 8, wherein said purified wastewater is discharged without further biological treatment.

10. A process as claimed in claim 6, wherein said temperature is in the range of about 55 to 65° C.

11. A process as claimed in claim 10, wherein said temperature is in the range of about 60 to 65° C.

12. A process as claimed in claim 1, wherein said pH is in the range of about 6 to 6.5.

13. A process as claimed in claim 1, wherein said ozone-containing oxygen stream comprises from about 5 to 8% by volume of ozone.

14. A process as claimed in claim 1, wherein a gas is obtained at the top of said first reaction zone comprising less than about 0.2% by volume of ozone.

15. A process as claimed in claim 1, wherein said wastewater to be treated contains inorganic nitrogen compounds.

16. A process as claimed in claim 15, said process reducing the quantity of said inorganic nitrogen compounds to less than about 1.5 ppm.

17. A process for breaking down aromatics in industrial wastewater that contain small amounts of aromatics by reaction with an ozone-containing oxygen stream comprising the steps of:
    (a) introducing an industrial wastewater feed stream at a pH of between 4 to 7 and at a temperature of between 40 to 70° C. into the bottom of a first stage of a two-stage reaction zone, and causing said wastewater feed stream to flow upwardly through said first stage reaction zone;
    (b) withdrawing wastewater overflow from the top of said first stage reaction zone and introducing said withdrawn wastewater overflow into the bottom of a second stage of said two-stage reaction zone such that said introduced wastewater overflow from said first stage reaction zone flows upwardly within said second stage reaction zone;
    (c) introducing said ozone-containing oxygen stream into the bottom of said second stage reaction zone and allowing said introduced ozone-containing oxygen stream to flow upwardly within said second stage reaction zone cocurrently with said withdrawn wastewater overflow introduced into the bottom of said second stage reaction zone;
    (d) withdrawing a intermediate waste gas stream from the top of said second stage reaction zone and introducing said withdrawn intermediate waste gas stream into the bottom of said first stage reaction zone so that said withdrawn intermediate waste gas stream introduced into the bottom of said first stage reaction zone flows upwardly within said first stage reaction zone cocurrently with said wastewater feed stream;
    (e) withdrawing purified wastewater from the top of said second stage reaction zone; and
    (f) withdrawing a final waste gas stream from the top of said first stage reaction zone.

18. A process as in claim 17, wherein step (f) includes recycling a portion of said final waste gas stream to the bottom of said first stage reaction zone.

19. A process as in claim 18, wherein said recycled portion of said final waste gas stream is mixed with said intermediate waste gas stream withdrawn from the top of said second stage reaction zone, and wherein the waste gas mixture is introduced into the bottom of said first stage reaction zone.

20. A process as in claim 17, wherein step (c) includes separating a bleed stream of said ozone-containing oxygen stream and introducing said separated bleed stream together with said withdrawn intermediate waste gas stream directly into the bottom of the first stage reaction zone.

* * * * *